(12) United States Patent
Andonian et al.

(10) Patent No.: US 10,364,850 B2
(45) Date of Patent: Jul. 30, 2019

(54) CLUTCH MECHANISM

(71) Applicant: FORD GLOBAL TECHNOLOGIES, LLC, Dearborn, MI (US)

(72) Inventors: Brian J. Andonian, Plymouth, MI (US); Jihong Guo, Ann Arbor, MI (US); Dennis W. Isken, II, Frankenmuth, MI (US); Jacob M. Povirk, Franklin, MI (US); Kevin M. Sullivan, Clinton Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 743 days.

(21) Appl. No.: 13/657,947

(22) Filed: Oct. 23, 2012

(65) Prior Publication Data
US 2014/0110211 A1    Apr. 24, 2014

(51) Int. Cl.
| | |
|---|---|
| *F16H 48/30* | (2012.01) |
| *F16H 48/00* | (2012.01) |
| *F16D 11/00* | (2006.01) |
| *F16D 11/14* | (2006.01) |
| *F16H 48/24* | (2006.01) |
| *F16H 48/34* | (2012.01) |

(52) U.S. Cl.
CPC ............ *F16D 11/14* (2013.01); *F16H 48/24* (2013.01); *F16H 48/30* (2013.01); *F16H 48/34* (2013.01)

(58) Field of Classification Search
CPC ................ F16H 48/295; F16H 48/34
USPC ..... 192/69.7, 69.71, 66.1, 66.2, 69.61, 53.1, 192/52.5, 85.56; 3/69.7, 69.71, 66.1, 3/66.2, 69.61, 53.1, 52.5, 85.56
See application file for complete search history.

(56) References Cited

U.S. PATENT DOCUMENTS

| | | |
|---|---|---|
| 3,626,779 A | 12/1971 | Howard |
| 3,678,557 A | 7/1972 | Howard |
| 3,752,003 A | 8/1973 | Dunn et al. |
| 3,772,935 A | 11/1973 | Dunn et al. |
| 3,832,763 A | 9/1974 | Schober |
| 4,265,143 A * | 5/1981 | Goscenski et al. ........... 475/232 |
| 4,599,775 A | 7/1986 | Buscher |
| 4,715,248 A * | 12/1987 | Gant ....................... F16H 48/08 192/56.31 |
| 5,701,574 A | 12/1997 | Derflinger et al. |
| 6,053,293 A | 4/2000 | Sato et al. |
| 6,551,209 B2 * | 4/2003 | Cheadle et al. .............. 475/150 |
| 6,827,661 B2 * | 12/2004 | Fusegi et al. ................. 475/150 |
| 6,905,011 B2 | 6/2005 | Ooka |
| 7,399,248 B2 * | 7/2008 | Kleinhans ............... F16H 48/08 475/149 |
| 7,484,611 B2 | 2/2009 | Ooka |
| 7,827,692 B2 | 11/2010 | Geiman |
| 7,905,018 B2 | 3/2011 | Ichikawa et al. |
| 2007/0197338 A1 * | 8/2007 | Fusegi ......................... 475/231 |
| 2007/0289834 A1 * | 12/2007 | Razzacki .................... 192/53.3 |

(Continued)

*Primary Examiner* — Jacob S. Scott
*Assistant Examiner* — Ryan P Dodd
(74) *Attorney, Agent, or Firm* — David B. Kelley; MacMillan, Sobanski & Todd, LLC

(57) ABSTRACT

A clutch mechanism includes a gear including clutch teeth, a housing having axial holes, including displaceable pins, each pin fitted in one of the holes, and a plate of forged powdered metal, the plate including second teeth, axial displacement of the pins causing axial displacement of the plate relative to the gear and the housing, and engagement of the second teeth with the clutch teeth.

13 Claims, 5 Drawing Sheets

(56) References Cited

U.S. PATENT DOCUMENTS

2008/0242469 A1\* 10/2008 Jenski et al. .................. 475/231
2010/0311533 A1\* 12/2010 Balenda et al. .............. 475/231
2014/0235397 A1\* 8/2014 McMillan ............... F16H 48/24
　　　　　　　　　　　　　　　　　　　　　　　　475/231

\* cited by examiner

CLUTCH MECHANISM

1. FIELD OF THE INVENTION

This invention relates generally to a dog clutch actuation mechanism, and more particularly to a locking differential mechanism for a motor vehicle axle.

2. DESCRIPTION OF THE PRIOR ART

Rotating components often require a clutch to transfer torque and rotation from one rotating component to another. The clutch member can be a friction plate or dog clutch, which does not allow any slipping between rotating components during engagement.

Common automotive applications of torque transfer clutches include transmissions, transfer cases, air conditioner compressors, power take-offs and many others. Torque transfer clutches are also commonly used in non-automotive applications such as industrial motors, conveyors, agricultural equipment and lawn mowing equipment. The torque transfer clutches can be engaged via compressed air, hydraulic fluid, mechanical leverage or magnetic actuation.

A need exists for a mechanism that amplifies axial displacement of the coil, such as a lever mechanism, which provides the locking mechanism, such as a dog clutch, to operate over a large displacement stroke.

SUMMARY OF THE INVENTION

A clutch mechanism includes a gear including clutch teeth, a housing having axial holes, including displaceable pins, each pin fitted in one of the holes, and a plate of forged powdered metal, the plate including second teeth, axial displacement of the pins causing axial displacement of the plate relative to the gear and the housing, and engagement of the second teeth with the clutch teeth.

Ramped contact surfaces on the plate and housing provide axial engagement force proportional to the torque applied to the gear.

The locking plate may have a uniform thickness and has a high diameter-to-thickness ratio, which is not easily attained by conventional hot-forging processes that require extensive machining after forging to meet the high d/t ratio.

Net-formed teeth on the locking plate require no machining after forging. As-forged ramped contact surfaces on the locking plate require no post-forging machining operations.

Separate, loose actuation pins are not integral or pressed into the locking plate, but instead are piloted in axial holes in the housing.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
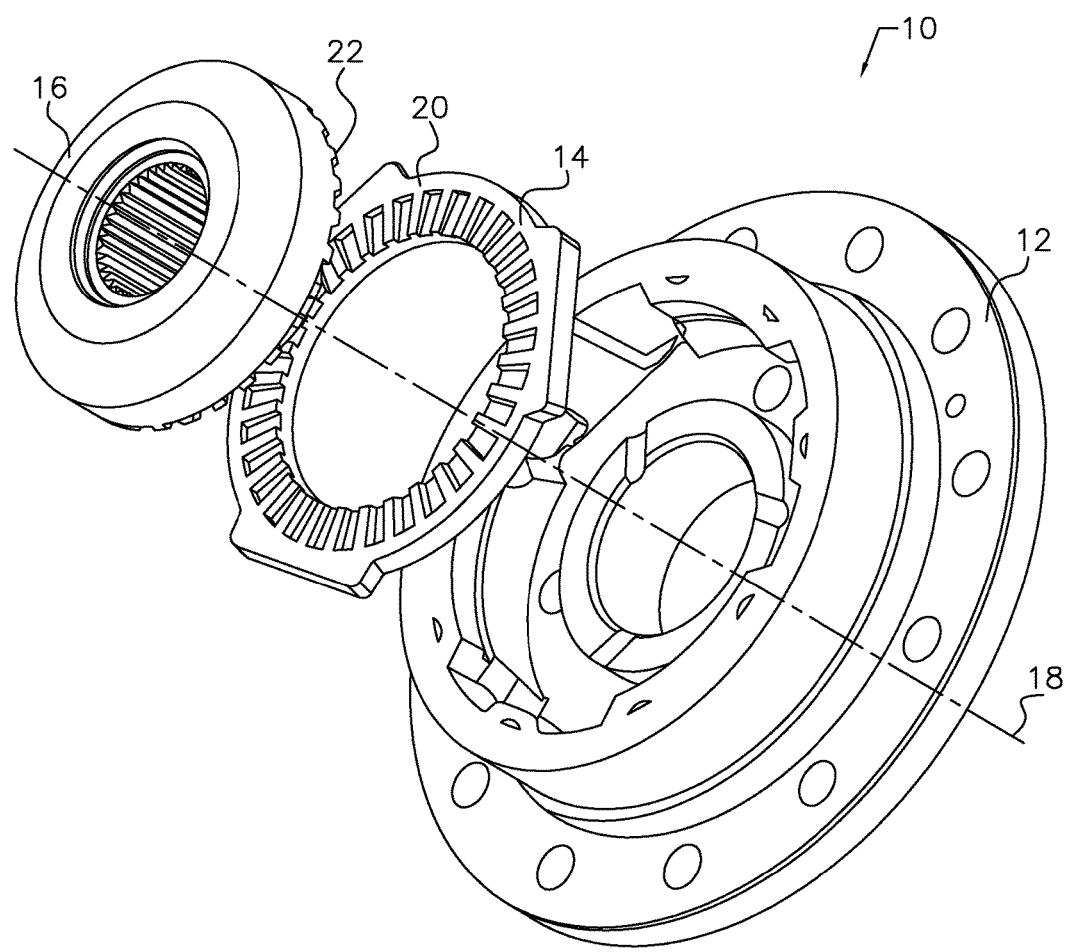
FIG. 1 is a perspective view showing components of a clutch mechanism in spaced relation.

As FIG. 1 shows a mechanical dog clutch locking mechanism 10 for a locking differential of a motor vehicle includes a housing 12, a locking plate 14, and a driven gear or shaft 16. The locking plate is fixed against rotation within the housing 12, and the locking plate can move axially within the housing. The gear 16 is mounted for rotation about a common axis 18 with the housing. When the locking plate 14 is moved into axial engagement with the gear 16, either by mechanical, hydraulic, pneumatic, or electromagnetic means, teeth 20 on one face of the locking plate mesh with teeth 22 on the back face of the gear such that torque can be transmitted between the gear and housing 12.

Figure 3:
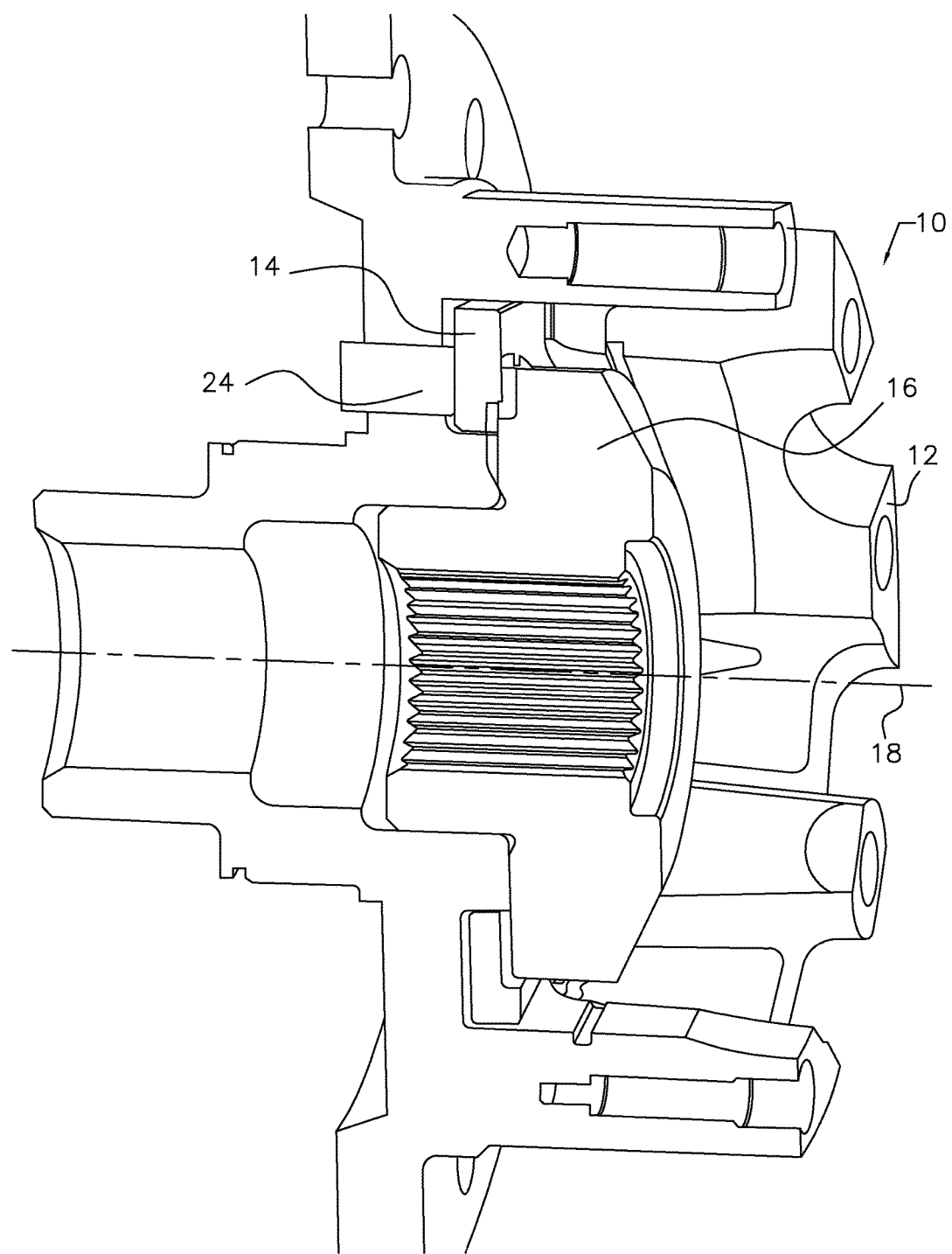
FIG. 3 is a perspective cross section showing the mechanism of FIG. 2 in its engaged state.

FIG. 3 illustrates the locking mechanism 10 in its engaged state.

Figure 2:
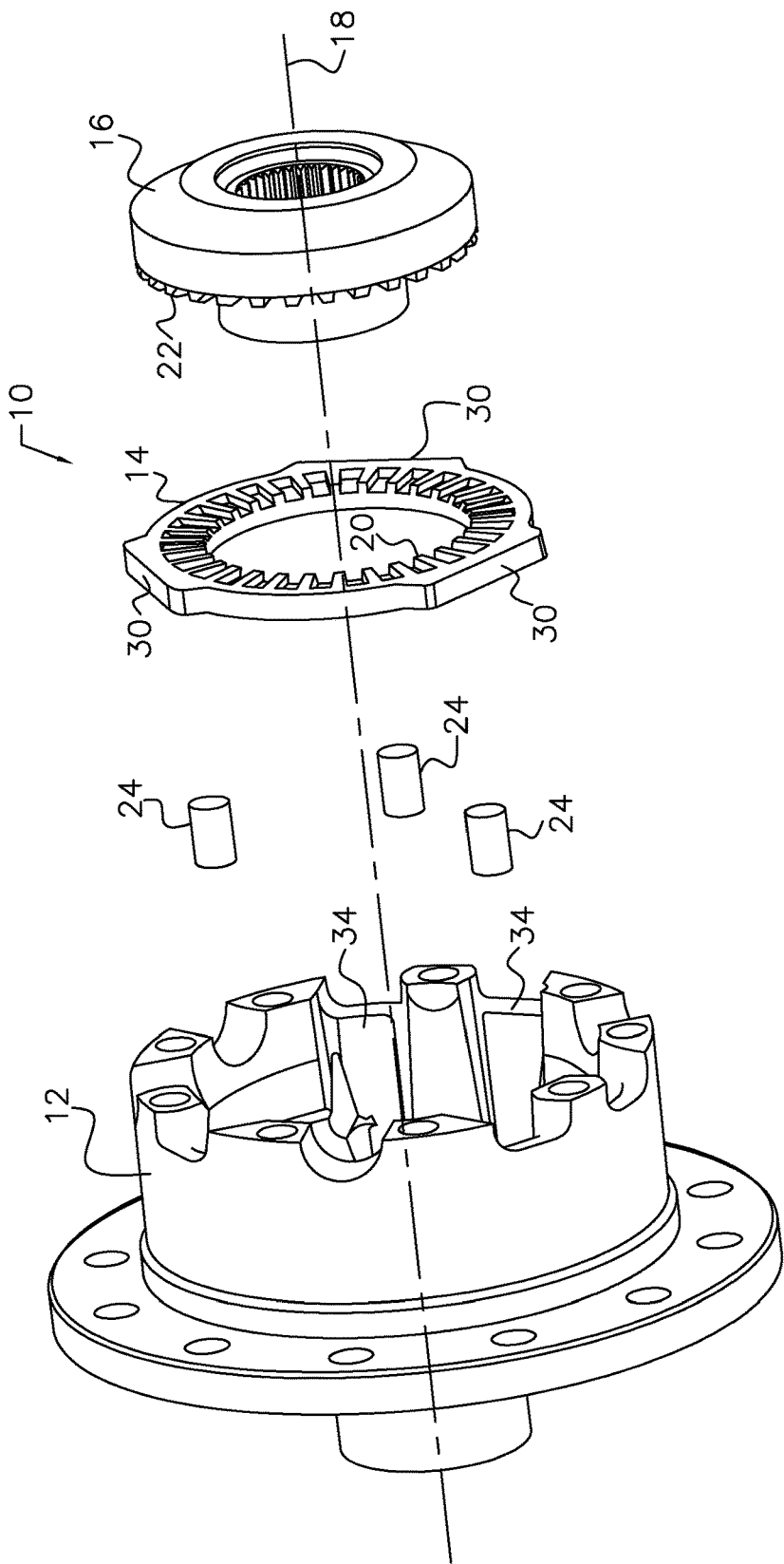
FIG. 2 is a perspective view similar to that of FIG. 1 showing displaceable pins of the mechanism.

As FIGS. 2 and 3 show, two or more engagement pins 24, arranged circumferentially around axis 18, can translate axially within housing 12, but are fixed against rotation about the axis. Drilled and reamed holes formed in housing 12, pilot the pins 24 and prevent tipping of the pins with respect to the rotational axis 18.

An axial engagement force, which may be produced mechanically, electromechanically, hydraulically or pneumatically, is applied to the inner end of each engagement pin 24. The opposite, outer end of each pin 24 contacts the side of the locking plate 14 that is formed without teeth. The force applied to engagement pins 24 moves locking plate 14 into contact with gear 16.

It is desirable that the axial engagement force applied to each engagement pin 24 be substantially equal in magnitude to prevent tipping of the locking plate 14 with respect to axis 18.

A return spring is installed in housing 12 and arranged to provide force necessary to return locking plate 14 to the disengaged state when axial engagement force is not applied to the engagement pins 24. The force produced by the return spring must be less than the total axial engagement force when energized, in order to allow axial movement of the locking plate 14.

The locking plate 14 is preferably formed by a manufacturing process called forging powdered metal (FPM), which produces superior strength and fatigue endurance limit due to its high density and highly isotropic material properties.

In order to minimize the axial dimension of the packaging space required for mechanism 10, locking plate 14 has a relatively large outer diameter (d) relative to its thickness (t), the d/t ratio being about 15. Preferably the locking plate diameter-to-thickness ratio (d/t) is greater than eight. This diameter-to-thickness ratio is extremely difficult to manufacture using a conventional hot forging process. The FPM process allows for a large diameter-to-thickness ratio with minimum post-forging machining operations.

Figure 4:
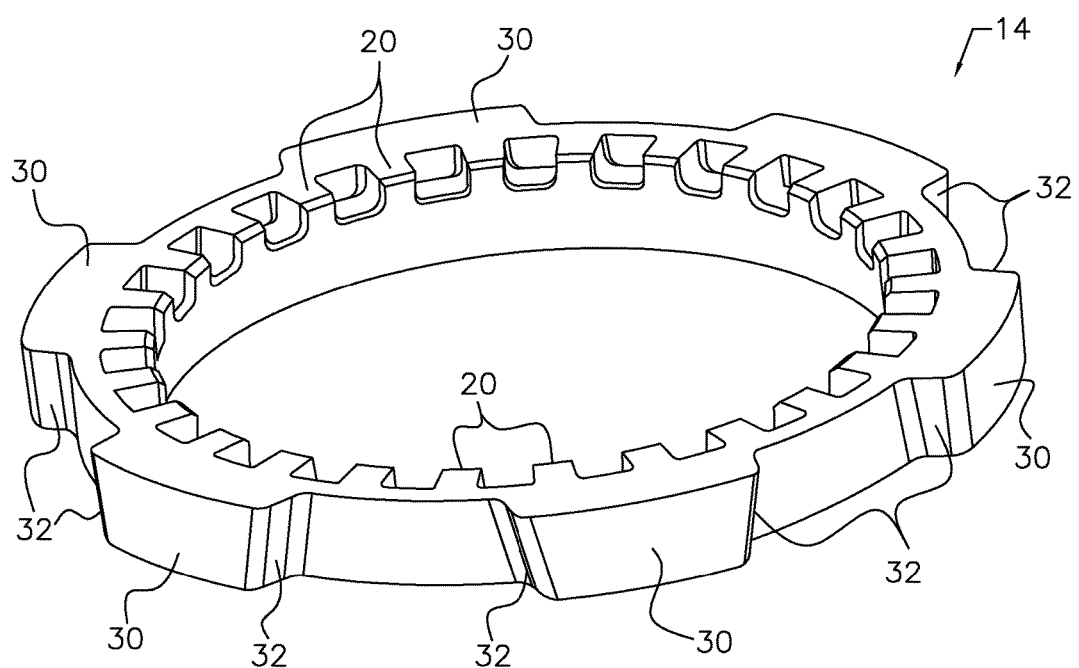
FIG. 4 is a perspective top view of the locking plate showing its clutch teeth.
Figure 5:
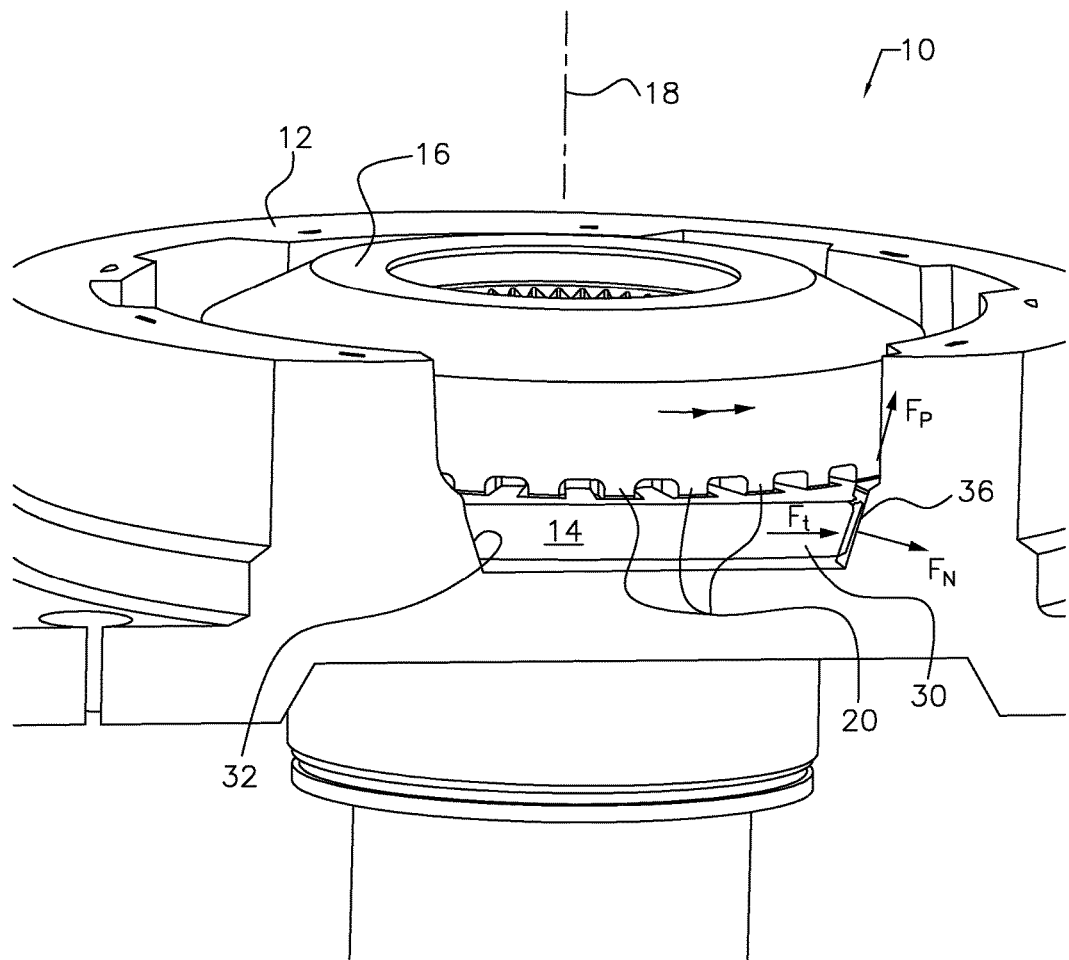
FIG. 5 is a perspective side view partially in cross section showing the mechanism in its engaged position.

With the FPM process it is possible to implement as-forged features on locking plate 14, such as the ramp contact surfaces 32 on the locking plate 14, shown in FIGS. 4 and 5.

Locking plate 14 includes legs 30 spaced angularly about a longitudinal axis, the legs including first surfaces 32 inclined with respect to the longitudinal axis 18. Housing 12 includes recesses 34 spaced angularly about axis 18, each recess 34 sized to receive one of the legs therein. Housing 12 is formed with second surfaces 36, each second surface being substantially parallel to one of the first surfaces 32 and engageable with the first surfaces when the locking ring 14 is engaged with the gear. inclination of the first and second surfaces and a reaction to torque transmitted by the locking gear to the case producing a force on the locking ring tending to move the locking ring toward the gear.

When torque is applied to the gear 16 while mechanism 10 is engaged, each surface 32 of locking plate 14 contacts a parallel, complementary ramp surface 36 on housing 12 at three of the six surfaces 32 on the locking plate 14. Locking plate 14 applies a tangential force Ft, proportional to the torque applied to gear 16, to housing 12 at each of the three mating surface 32. The housing 12 applies an equal and oppositely directed reaction force to the locking plate 14 at each of the mating surfaces 32. Each tangential force applied to the locking ring 14 has a component that is normal Fn to surface 32 and a component that is parallel Fp to surface 32. The force component Fp acts to move the locking plate 14 toward the gear 16 and to keep the locking plate 14 engaged with the gear, as shown in FIG. 5. The double-headed arrow in FIG. 5 represents the direction of torque applied to gear 16.

The depth of the teeth 20 of locking plate 14 is in the range between 25% and 40% of the thickness of the locking plate.

In accordance with the provisions of the patent statutes, the preferred embodiment has been described. However, it should be noted that the alternate embodiments can be practiced otherwise than as specifically illustrated and described.

The invention claimed is:

1. A clutch mechanism, comprising:
a gear including clutch teeth;
a housing having cylindrical axial holes, including displaceable circular cylindrical pins, each pin axially slidable within a respective one of the holes;
a plate including second teeth, the pins axially displaceable relative to the plate, with axial displacement of the pins causing axial displacement of the plate relative to the gear and the housing, and engagement of the second teeth with the clutch teeth.

2. The clutch mechanism of claim 1, wherein the plate is formed of forged powdered metal.

3. The clutch mechanism of claim 1, wherein the pins are angularly spaced about a longitudinal axis.

4. The clutch mechanism of claim 1, wherein:
the plate includes first surfaces inclined with respect to a longitudinal axis; and
the housing includes second surfaces substantially parallel to the first surfaces and engageable with the first surfaces when the second teeth are engaged with the clutch teeth, inclination of the first and second surfaces and a reaction to torque applied to the gear while the mechanism is engaged producing a force on the plate tending to move the plate toward the gear.

5. The clutch mechanism of claim 1, wherein:
the plate is generally ring-shaped and includes legs extending radially outward from the ring spaced angularly about a longitudinal axis, the legs including first surfaces inclined with respect to the axis; and
the housing includes recesses spaced angularly about the axis, each recess sized to receive one of the legs therein, second surfaces being substantially parallel to the first surfaces and engageable with the first surfaces when the plate ring is engaged with the gear, inclination of the first and second surfaces and a reaction to torque applied to the gear while the mechanism is engaged producing a force on the plate tending to move the plate toward the gear.

6. The clutch mechanism of claim 1, wherein a depth of the second teeth is in a range between 25 percent and 40 percent of a thickness of the plate.

7. A clutch mechanism, comprising:
a gear including clutch teeth;
a generally ring-shaped plate including second teeth and legs extending radially outward from the ring, the legs including first surfaces inclined with respect to a longitudinal axis;
a housing having cylindrical axial holes, including displaceable circular cylindrical pins, each pin fitted in one of the holes, second surfaces substantially parallel to the first surfaces and engageable with the first surfaces when the second teeth are engaged with the clutch teeth, inclination of the first and second surfaces such that a reaction to torque applied to the gear while the mechanism is engaged produces a force on the plate tending to move the plate toward the gear.

8. The clutch mechanism of claim 7, wherein axial displacement of the pins causes axial displacement of the plate relative to the gear and the housing, and engagement of the second teeth with the clutch teeth.

9. The clutch mechanism of claim 7, wherein the pins are axially displaceable relative to both the housing and the plate.

10. The clutch mechanism of claim 7, wherein the pins are angularly spaced about a longitudinal axis.

11. The clutch mechanism of claim 7, wherein a depth of the second teeth is in a range between 25 percent and 40 percent of a thickness of the plate.

12. The clutch mechanism of claim 7, wherein
the legs are spaced angularly about the axis; and
the housing includes recesses spaced angularly about the axis, each recess sized to receive one of the legs therein.

13. The clutch mechanism of claim 7, wherein the plate is of forged powdered metal.

* * * * *